CATHODE RAY TUBE HAVING A COLOR-SELECTION ELECTRODE WITH LARGE APERTURES

Original Filed June 14, 1961 2 Sheets-Sheet 1

INVENTOR
Sam H. Kaplan
BY John J. Pederson
ATTORNEY

INVENTOR
Sam H. Kaplan
BY John J. Pederson
ATTORNEY

United States Patent Office

Re. 26,251
Reissued Aug. 15, 1967

26,251

CATHODE RAY TUBE HAVING A COLOR-SELECTION ELECTRODE WITH LARGE APERTURES

Sam H. Kaplan, Chicago, Ill., assignor to The Rauland Corporation, a corporation of Illinois Original No. 3,146,369, dated Aug. 25, 1964, Ser. No. 117,060, June 14, 1961. Application for reissue July 28, 1966, Ser. No. 570,128
18 Claims. (Cl. 313—92)

Matter enclosed in heavy brackets [ ] appears in the original patent but forms no part of this reissue specification; matter printed in italics indicates the additions made by reissue.

The present invention relates generally to cathode-ray tubes for use in color television receivers and the like and more particularly to improvements in single-gun cathode-ray tubes of the simultaneous presentation type for reproducing images in simulated natural colors.

Cathode-ray tubes of the above-mentioned type usually comprise an evacuated envelope made of glass or any suitable material, having a face-plate provided at the enlarged end of the envelope. An electron gun assembly, provided in the neck portion of the tube, produces an electron beam, controlled by the deflection means of the tube, to simultaneously excite phosphor areas emitting different colors, three in this case.

The screen comprises a mosaic of a plurality of clusters of elemental phosphor areas adapted to emit light of different colors when excited by the impinging electron beam.

A color-selection electrode, usually a multi-apertured mask, conventionally made of a thin metal sheet, opaque to the passage of electrons, is disposed between the electron gun and the image screen in juxtaposition with the screen. The mask is provided with a plurality of apertures in registry with and geometrically related in shape to the clusters of phosphor areas on the screen, the apertures being disposed in a selected geometrical array on the mask in registry with the geometrical array of the clusters of phosphor areas on the mosaic image screen of the tube. By controlling the angle of incidence of the electron beam through the apertures in the mask, the electron beam is caused to impinge predetermined partial areas of the clusters of different phosphor areas on the screen, thus producing a predetermined color emission of the selected cluster areas reproducing the original scene as a visible picture in natural color on the screen.

The simultaneous presentation of the different colors on the mosaic image screen in a single-gun color cathode-ray tube presents numerous problems. One of the major problems is to ensure the correct registration of the electron beam onto the mask and the screen to produce a uniform color reproduction, and to prevent color contamination of the reproduced image. Another problem is unsatisfactory brightness of the reproduced image, which is largely due to low mask transmission for electrons. Also, due to mechanical, magnetic, thermal and electrical effects, contamination of the individual colors, including white, may occur; this distorts to a substantial degree the presentation of the color images on the screen and contributes to the inadequate contrast which is characteristic of prior single-gun color tubes.

Accordingly, it is a general object of this invention to provide a new and improved cathode-ray tube for reproducing images in simulated natural color.

Another object of the present invention is to provide an improved single-gun cathode-ray tube for reproducing images in simulated natural color, the reproduced image being of substantially improved brightness.

It is another object of this invention to provide an improved single-gun cathode-ray tube for reproducing images in simulated natural color, in which the individual colors including white are more accurately reproduced.

A further object of the present invention is to provide a new and improved single-gun cathode-ray tube for reproducing images in simulated natural color, in which most of the ambient light falling on the image screen is effectively absorbed, thus providing materially improved contrast in the reproduced image.

A cathode-ray tube for reproducing images in simulated natural color, constructed in accordance with the present invention, comprises a mosaic image screen comprising a multitude of similar clusters of elemental phosphor areas, each cluster composed of one area of each of a plurality of phosphors exhibiting different color-radiation in response to electron bombardment and [collectively balanced to produce] *producing* white light output in response to [total-area] *concurrent* excitation *of the plurality of phosphors,* and each cluster spaced from each adjacent cluster by a distance of at least one third of its own characteristic transverse dimension; a color-selection electrode, in juxtaposition with the image screen, comprising a corresponding multitude of apertures, each aligned with one of the clusters and each aperture being of *a* [corresponding] shape *corresponding* [and at least as large in size as] *to that of* the cluster with which it is aligned; means for projecting an electron beam through the apertured color-selection electrode onto the image screen; means for modulating the intensity of the electron beam; and means for varying the angle of incidence of the electron beam on the color-selection electrode to establish [total-area] excitation of the clusters for white light output and to establish controlled varying partial-area excitation of the clusters for different component colors of the reproduced image.

The inventive arrangement comprises a single-gun tube having a color-selection electrode referred to in the following as a mask and wherein the color deflection device includes two pairs of electrostatic color deflection plates at an angle to each other. The tube also includes a mosaic image screen which can be planar or of spherical configuration and may be mounted either on the face-plate of the tube or on a target plate, disposed behind the face-plate. In the embodiment to be described, the mosaic image screen is disposed on the inside of the face-plate. The screen comprises a multitude of similar clusters of elemental phosphor areas whereby each cluster is composed of one area of each of the plurality of phosphors exhibiting different color radiation in response to the electron bombardment. The arrangement is such that the phosphor areas are balanced collectively with respect to each other to produce white light output in response to the excitation by the electron beam of the whole area of the cluster.

An important feature of the inventive arrangement is the provision of intermediate areas surrounding and separating the phosphor cluster.

Another feature of the inventive arrangement is the spacing of the phosphor clusters from each other by at least one third of their transverse dimensions. The individual phosphor areas of the clusters may be of any geometrical nesting configuration: rectangular, circular or hexagonal.

The mask which is positioned in juxtaposition with the screen comprises a multitude of apertures corresponding and aligned with each of the clusters, the size of the apertures in the mask being at least as large as the size of the clusters with which these apertures are aligned. The apertures are preferably dimensioned to provide an electron beam image on the image screen, which is equal to or larger than the size of the phosphor clusters.

The electron beam from the electron gun is deviated by the above mentioned electrostatic color deflection electrodes, and is deflected by a yoke member provided in the neck portion of the tube to scan the screen, to establish total-area excitation of the clusters on the screen for white light output and partial-area excitation for different component colors of the clusters by controlled variation of the partial-area excitation of the clusters. A convergence system for re-converging the electron beam in the plane of the mask or screen is provided in the tube in conventional manner.

The partial excitation of the respective individual phosphor areas in the clusters is effected by a corresponding, limited displacement of the electron beam image on the screen away from the total-area or white position into the intermediate areas between the clusters on the screen in different predetermined radial directions corresponding to the respective position of the individual phosphor areas of different color.

The features of the present invention, which are believed to be novel, are set forth with particularity in the appended claims. The invention, together with further objects and advantages thereof, may be best understood, however, by reference to the following description of exemplary embodiment of this invention taken in connection with the accompanying drawings, in the several figures of which like reference numerals identify like elements, and in which:

FIGURE 2b is a fragmentary view of a mask used in the cathode-ray tube comprising the screen of FIGURE 2a.

Figure 1:
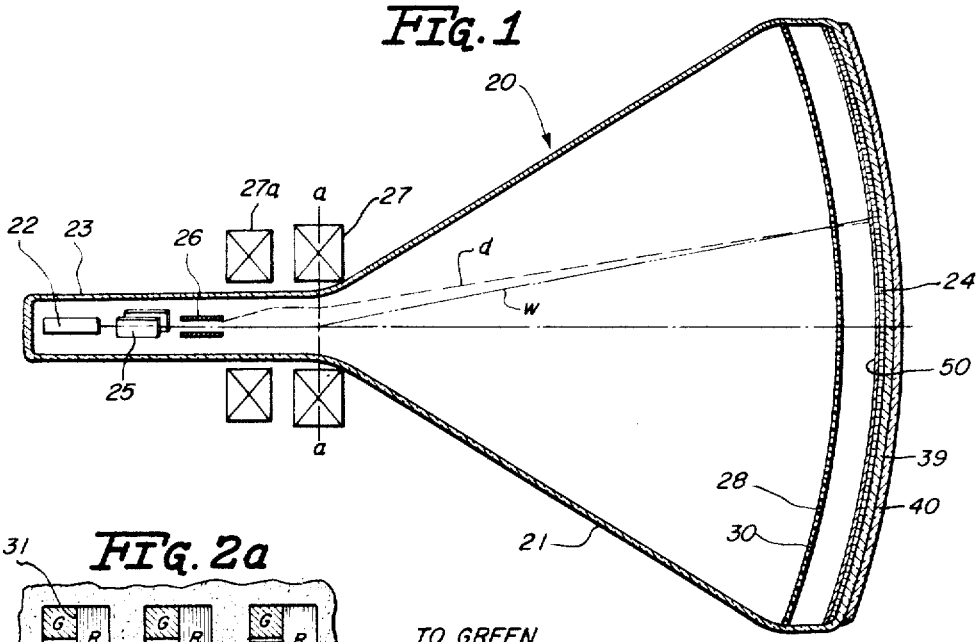
FIGURE 1 is a schematic view of a single-gun multicolor cathode-ray tube embodying the invention.

A color reproducing cathode-ray tube 20 having a glass envelope 21 is shown in FIGURE 1. For clarity, most of the physical details, which do not relate to the present invention, are omitted. The single electron gun is indicated by a rectangle 22 which is disposed in the neck portion 23 of the cathode-ray tube envelope 21. The electron gun is arranged to emit an electron beam W which is accelerated in known manner and passes through a deflection field produced by scanning signals applied to a yoke member 27. This deflection field changes the course of the electron beam in accordance with the instantaneous sweep signals applied to the yoke member 27. Such course change of the electron beam is gradual within the deflection field; for purpose of illustration, however, the change of the course of the electron beam is shown as occurring in a plane a—a passing through the yoke member 27. After being deflected, the electron beam W is directed through the apertures in the color-selection electrode or mask 28 to impinge on the scanning side (the side on which the electron beam components are incident) of the image mosaic screen 24.

The cathode-ray tube 20 is also provided in known manner with a convergence system, represented in the drawing by a convergence yoke assembly 27a, for converging the electron beam both statically and dynamically in the plane of the mask 28. The mask structure 28 is provided with a plurality of apertures 30, the screen 24 being covered with a corresponding plurality of phosphor clusters 31. An electron transparent aluminum or other conductive, reflective layer 50, preferably, covers in conventional manner the entire rear surface of the screen to improve the brightness, and to apply an operational potential to the screen. Three interspersed similar groups of phosphor areas, one for each primary color, are provided on the screen, and, adjacent phosphor areas, one from each group, constitute the respective clusters or triads 31. The phosphor areas and thus the apertures in the mask may be of circular configuration as in conventional shadow mask tubes, but other shapes of the phosphor areas on the screen and of the apertures in the mask are feasible, as for instance, rectangular, square and hexagonal.

The different groups of phosphor areas on the screen 24, regardless of their configuration, possess different color-response characteristics, each group emitting light of a different one of the elemental or primary colors when excited by the electron spot. Different phosphor materials are used for producing the elemental colors green, blue and red. The construction of the tube as thus far described, and the manner of its construction are well known in the art.

Figure 2A:
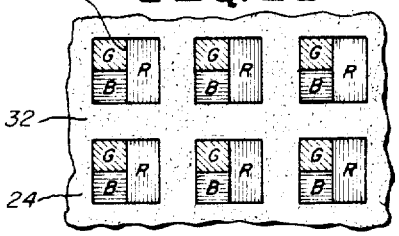
FIGURE 2a is a fragmentary view of the screen of one of the embodiments of the present invention in which the clusters are of rectangular configuration.
Figure 2B:
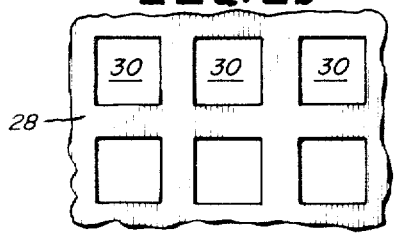

In accordance with the present invention the control of the color presentation in a single-gun tube, using a simultaneous type of presentation, is effected by means of a subtractive area approach. To this end, apertures 30 in mask 28 are individually made larger than the associated individual clusters of phosphor areas, and intermediate inactive spaces or "dead" areas are provided between adjacent phosphor clusters. FIGURE 2a shows the phosphor cluster 31 of generally square configuration positioned on the image screen 24 in such a manner that each cluster 31 is separated from all adjacent clusters by intermediate non-phosphor coated areas of approximately one half the width of an individual cluster 31. Each cluster is composed of phosphor areas R, B and G for producing red, blue and green light respectively, the red phosphor areas R being larger than the blue and green areas B and G to compensate for the lower conversion efficiency of known red phosphor materials. FIGURE 2b shows apertures 30 individually of substantially the same size as the individual clusters 31, or slightly larger, and of corresponding configuration. Each aperture 30 in mask 28 is aligned with a phosphor cluster 31 on screen 24.

When the electron beam W is not deflected by the color deflection plate pairs 25 and 26 the electron spots are centered on the phosphor clusters 31, providing total-area excitation thereof and producing pure white since the sectional areas of different colors of the cluster are proportioned relative to the respective phosphor efficiencies to be balanced for white.

For producing different colors, the electron beam passing through the respective aperture in the mask, is deflected under the control of color selection plates 25, 26 to direct the electron spot partially into the intermediate area between the phosphor clusters; the electron spot is thus positioned in part on the section of the phosphor cluster of a predetermined, individual color and in part in the intermediate "dead" area to provide controlled partial-area excitation of the phosphor clusters, the inter-cluster spacings being made sufficiently large to enable the presentation of a pure color which is not contaminated by the placement of the electron spot on any section of the adjacent phosphor clusters.

According to a further feature of this invention, the whole intermediate area 32 between the phosphor clusters 31 is preferably occupied by a light absorbing material.

Figure 3:
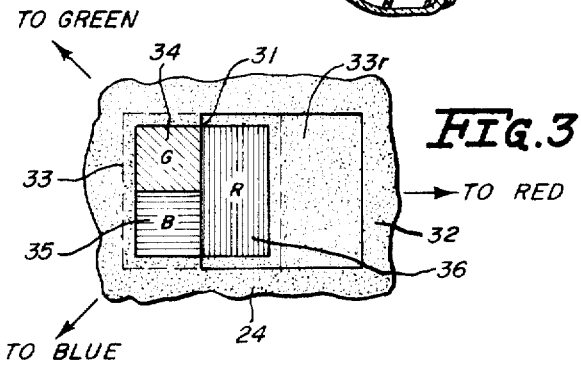
FIGURE 3 is a fragmentary view of the screen of the inventive tube, showing the relative positioning of a phosphor cluster and the corresponding location of the electron beam image on the screen in writing a pure red color.

The color-selection process may more readily be visualized from a consideration of FIGURE 3 in which the positions of the electron spot 33, relative to the individual sections of different color of the phosphor cluster 31, are indicated for white or monochrome reproduction, and for a pure component color respectively. When the beam is undeflected by deflection plates 25, 26, the electron spot 33 is centered on cluster 31 to provide total-area excitation thereof and produce white light. For a pure red component, the electron spot is deflected to the position designated 33r in which only the red phosphor component 36 of the cluster 31 is excited, the remaining portion of the electron spot overlapping on the intermediate area 32 separating the adjacent clusters.

Figure 4:
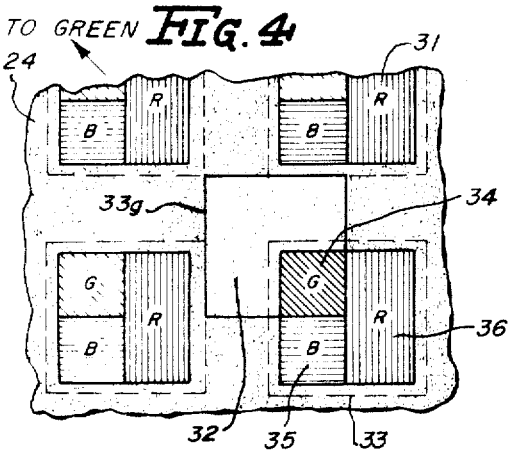
FIGURE 4 is a fragmentary view of the screen in which the location of the electron beam image on the screen is shown relative to a number of adjacent clusters when a pure green color is being written.

In order to obtain a pure green color, the electron spot is displaced to the position 33g, shown in FIGURE 4 in which only the green phosphor area 34 is excited, the remaining portion of the electron spot overlapping the intermediate space 32 between the energized cluster and the two adjacent clusters. In similar manner, a pure blue color is obtained by corresponding displacement of the electron spot to the left and downwardly from its neutral position 33.

Intermediate colors such as yellow, cyan, magenta and others are obtained by appropriately controlled displacement of the electron spot in other directions; for instance, for the cyan-color the electron spot is shifted to the left of its neutral or "white" position 33. For pastel colors the displacement of the electron spot is in the direction of the dominant hue.

It should be noted that although three directions of color deflection are needed for presentation of the three elemental colors, only two sets of plates are necessary since the net desired displacement of the electron spot can always be resolved into two mutually orthogonal displacements. Appropriate apparatus for developing the required color-control signals for application to deflection plates 25, 26 may be the same as that employed in conjunction with other single-gun color tubes and is well known in the art; see for example the October 1951 issue of the "Proceedings of the Institute of Radio Engineers," on pages 1195, 1198 and 1200 of the article entitled "A One Gun Shadow Mask Color Kinescope" by R. R. Law.

It is known in the art that substantial difficulties are encountered in the precise positioning of the electron spot relative to the location of the phosphor clusters on the screen. These irregularities in the electron beam landings are due to small variations of the environmental magnetic fields, thermal expansions, mechanical factors, etc. The exact positioning of the electron spot is also influenced by variations in the aperture sizes, variable spacings between the mask and the screen and variable sizes of the phosphor areas on the screen due to exposure variations in the screen fabrication process, as well as to possible errors in the convergence system. In order to compensate for such irregularities of the electron beam landings, tolerances are provided by making the apertures 30 in mask 28 slightly larger than the phosphor clusters 31. In this manner, it is ensured that slight displacements of the location of the electron spot 33 on the screen will not produce any undesirable changes in color presentations, thus compensating for the above mentioned irregularities and enabling pure whites to be obtained over the entire screen.

Figure 5:
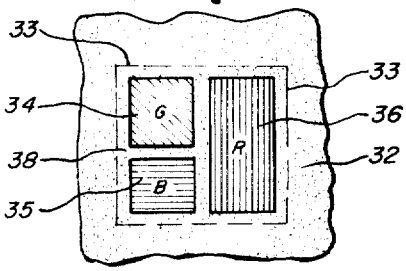
FIGURE 5 is a fragmentary view of another embodiment, in which the screen comprises a phosphor cluster in which the individual areas of different phosphors are of different size and are spaced from each other.

In a further and preferred arrangement shown in FIGURE 5, tolerance bands or intermediate inactive areas 38 are also provided between the individual color sections 34, 35 and 36 of the phosphor clusters 31 on the screen. These tolerance band spacings serve to provide tolerance for both white and saturated colors so that minor beam landing errors, due to various effects previously mentioned, cause little or no error in reproduced colors. This enables a pure saturated color presentation of the different individual color areas, which further improves the quality of the image on the screen.

Figure 6A:
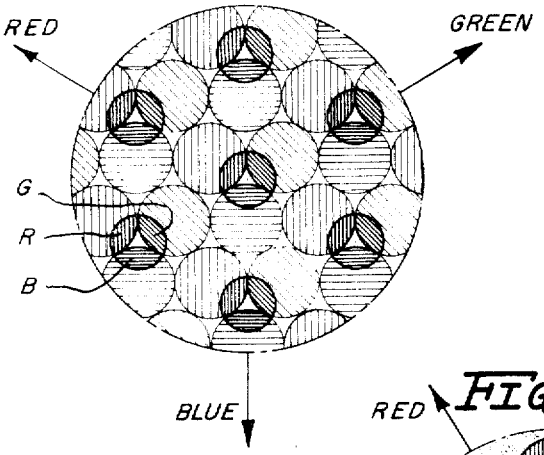
FIG. 6a (PRIOR ART)
FIGURE 6a is a fragmentary view of a screen showing a pattern of the clusters employed in prior art color tubes in which the clusters and the individual phosphor areas are of circular configuration.

FIGURE 6a of the drawings shows the distribution of the phosphor clusters on the screen in a simultaneous presentation one-gun color cathode-ray tube of a type known in the art, indicating phosphor dots of circular configuration. In such prior art devices, the aperture size is considerably smaller than the area of the individual phosphor dots, and hence much smaller than the individual phosphor clusters. Specifically, the individual apertures should not be greater than ¾ the diameter of the individual phosphor areas in order to avoid color contamination. This results in a mask transmission factor approximately 44% less than that provided in a tube embodying the present invention, which means that the brightness of a reproduced monochrome image is improved by a corresponding factor by employing the improved tube described herein.

Figure 6B:
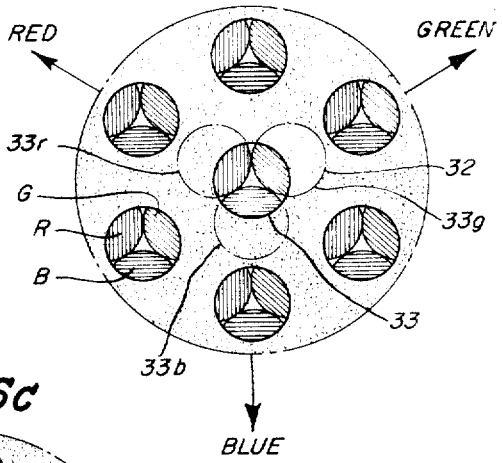
FIGURE 6b is a fragmentary view of the screen of a tube embodying the invention and comprising circular clusters.

Furthermore, the color circuitry required to achieve comparable color balance with the prior art mask and screen configuration is substantially more complicated due to the fact that, as the electron beam is deviated in any given color direction, the area of the electron spot on the dominant color increases and this increases the light output of that color. The color deflection means thus not only changes the respective color, but also its brightness so that it becomes desirable to reduce the electron beam current proportionately as purer colors are written. The present invention obviates the need for any such dynamic beam current control, by the use of subtractive area color control and the provision of intermediate "dead" spaces or tolerance bands 32 as shown in FIGURE 6b, from which it can readily be seen that variation in spot size as a function of color-control deviation cannot increase the area of component color excitation for even a pure primary color beyond that obtained with the undeviated electron spot.

The provision of the intermediate inactive areas 32 between the phosphor clusters also permits new and more highly efficient geometrical arrangements of the array of the phosphor clusters on the screen.

In accordance with another feature of the present invention, the size of the phosphor clusters may be increased without increasing the spacings between clusters. This can be accomplished by a predetermined rotation of the individual phosphor clusters with respect to the array. This displacement of the electron beam for writing pure colors of the three adjacent clusters is thus also shifted and now some portions of the intermediate space between these clusters are utilized for receiving unused portions of the electron spot in writing two or three different colors. This reduction of the intermediate spaces between the phosphor clusters, by having such spaces serve double or triple duty, substantially increases the brightness of the tube; in any event, however, the spacing between adjacent clusters must be greater than one-third the characteristic transverse dimension of an individual cluster.

Figure 6C:
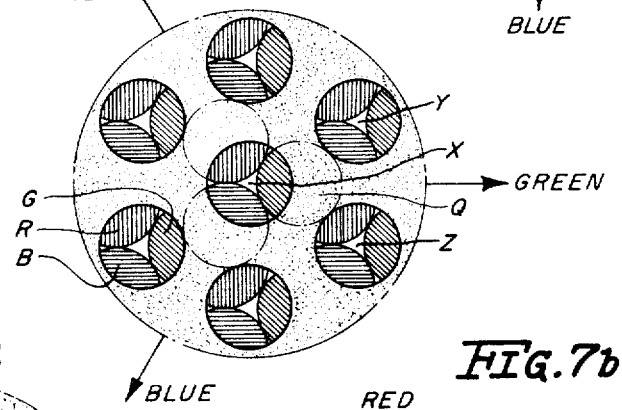
FIGURE 6c is a fragmentary view of the screen, similar to that of FIGURE 6b, but with the clusters shaped and disposed to provide higher efficiency.

Such an improved array is shown in FIGURE 6c, in which the area Q between the centrally disposed phosphor cluster X and two adjacent phosphor clusters Y and Z to its right is utilized for receiving unused portions of the electron spot during blue-color excitation of the upper right cluster Y, green-color excitation of the center cluster X, and red-color excitation of cluster Z.

Figure 7A:
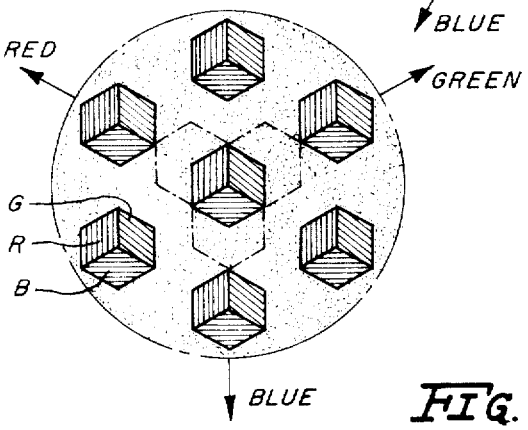
FIGURE 7a is a fragmentary view of the screen of a further embodiment of the present invention, in which the phosphor clusters are of hexagonal configuration.
Figure 7B:
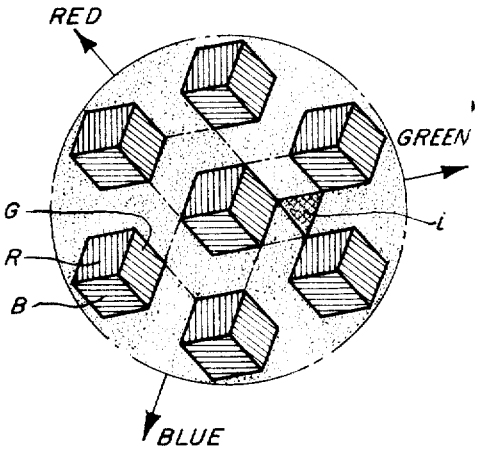
FIGURE 7b is a fragmentary view of a screen similar to that of FIGURE 7a, but with the phosphor clusters arranged to provide improved efficiency.

FIGURE 7a shows a modification of the arrangement of FIGURE 6b but with hexagonal apertures and cluster configuration; FIGURE 7b shows a modified array of hexagonal apertures and clusters, with a common area "i" between three adjacent phosphor clusters used for receiving the unused portions of the electron spots during red-, green-, and blue-color excitation respectively.

The contrast characteristics of the tube can be further improved and the ambient light reflections on the surface of the screen can be substantially reduced by blackening the intermediate areas 32 between the phosphor clusters; this may most conveniently be accomplished by coating these intermediate areas with a light absorbing material such as black manganese dioxide or finely divided silver particles. These blackened intermediate areas of the image screen substantially reduce the ambient light reflections by effectively absorbing the ambient light but do not attenuate the light emitted by the image screen.

Moreover, the blackening of the inactive areas intermediate the phosphor clusters permits the utilization of a clear glass face-plate 39 and clear glass safety-plate 40 (FIGURE 1) rather than the darkened glass conventionally used in television picture tubes, which further increases the brightness of the tube without loss of contrast and in many instances with improved contrast as well.

A further advantage consists in this, that desaturation effects caused by reflected ambient light are reduced by the increased effective absorption of this ambient light by the intermediate black areas between the phosphor clusters; this also improves the contrast ratios obtainable in the reproduced image without reducing the efficiency of the cathode-ray tube.

A preferred method of making the screen with blackened intermediate areas will now be described. The blackened areas should be screened first; different methods for producing the light absorbing surfaces between the phosphor areas of the image screen may be employed. For example, the black areas may be produced by coating the screen surface with a high contrast type silver halide emulsion, exposing this surface to light through the apertures in the mask, and then processing the exposed emulsion to yield a direct positive image, whereby all areas which are not struck by the light will exhibit a black silver image, and the areas struck by the light will be clear for receiving the desired phosphors. Then the different color phosphor areas are produced by any well known photoscreening technique, for instance, the conventional phosphor slurry process. In accordance with the respective color to be screened, the light source used in the photoscreening is displaced; in each exposure, the light is directed partly on the blackened area and partly on the desired portions of the clear areas. The phosphor adheres only in the respective areas struck by the light, thus producing phosphor areas partly on the blackened intermediate areas and partly in the clear areas. This procedure is repeated for the other two colors.

In operation of the tube, when a phosphor cluster is excited by the electron spot, light emitted by any portion of the phosphor area positioned over the blackened intermediate areas is effectively absorbed by the black particles underneath the phosphor coating and does not reach the observer. Only the light produced by the excited portions of the phosphor superposed on the clear areas is seen.

Figure 8A:
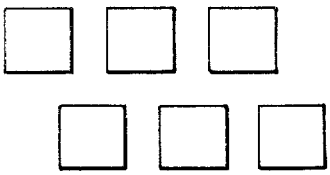
FIGURES 8a and 8b are schematic views showing two preferred types of distribution array of clusters on the screen of a color tube embodying the invention.
Figure 8B:
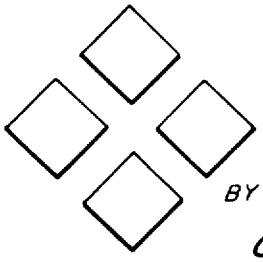

It should be noted that the use of certain configuration or patterns of phosphor clusters on the screen may result in the production of a more or less prominent beat pattern or moiré between the scanning lines and the phosphor cluster pattern. In accordance with a further embodiment of the present invention undesirable moiré effects are minimized by employing an orientation or pattern in which the phosphor clusters are staggered relative to each other as in FIGURE 8a, and/or rotated approximately 45 degrees relative to the scanning lines as in FIGURE 8b.

In an illustrative cathode-ray tube for reproducing images in simulated natural color, comprising a screen of the type shown in FIGURE 5, the area of red phosphor such as zinc phosphate, manganese activated, may be 0.012 x 0.0255 inch; the area of the green phosphor such as zinc silicate, manganese activated, is 0.012 x 0.0135 inch and the area of the blue phosphor such as zinc sulfide, silver activated, is 0.012 x 0.0115 inch, the tolerance bands being all of the same width of 0.0015 inch. For this cluster the projected size of the mask aperture is .0285 x .0285 inch with horizontal aperture spacings of .01425 inch and vertical separations of .01575 inch. The area of each phosphor cluster, including the adjoining inactive or "dead" spaces between itself and adjacent clusters, is .04275 x .04425 inch. It should be noted that no movement of the entire electron image on the screen changes the white color unless it exceeds the width of the tolerance band of 0.0015 inch.

In the phosphor system of the illustrated cathode-ray tube, the ratio of red phosphor area to total screen surface and therefore the percentage of the total beam current used for red phosphor excitation (since each red area is totally energized for a pure red color field), is equal to $$\frac{.012 \times .0255}{.04425 \times .04275} = 16.2\%$$

Since 68% of the total-area of the screen does not have any phosphor (the blackened intermediate areas), the need for the usual 70% filter action of the conventional face-plate of the tube is eliminated. The red output (which is a measure of useable brightness in such tubes) of the inventive tube is approximately equal to 16.2%. For comparison purposes a conventional three-gun shadow mask tube with 0.012 inch apertures and 0.028 inch spacing in a triangular type array, has a transmission of 16.6% which corresponds to the red brightness available; use of a 70% filter face-plate reduces this to about 11.6% (.7 x 16.6=11.6). Thus the total effective brightness of the inventive single-gun subtractive area tube may exceed that of a conventional three-gun shadow mask tube by approximately 40%. Considering further the elimination of the filtering action of the safety-glass which the blackened areas permit, the inventive tube may provide a picture as much as 130% brighter than the conventional three-gun shadow mask tube.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A cathode-ray tube for reproducing images in simulated natural color comprising: a mosaic image screen comprising a multitude of similar clusters of elemental phosphor areas, each cluster composed of one area of each of a plurality of phosphor exhibiting different color radiation in response to electron bombardment and collectively balanced to produce white light output in response to total area excitation, and each cluster spaced from each adjacent cluster by a distance of at least one-third of its own characteristic transverse dimension; a color-selection electrode, in juxtaposition with said image screen, comprising a corresponding multitude of apertures each aligned with one of said clusters and each aperture being of corresponding shape and at least as large in size as the cluster with which it is aligned; means for projecting an electron beam through said apertured color-selection electrode onto said image screen; means for modulating the intensity of said electron beam; and means for varying the angle of incidence of said electron beam on said color-selection electrode to establish total-area excitation of said clusters for white light output and to establish controlled varying partial-area excitation of said clusters for different component colors of said reproduced image.

2. A cathode-ray tube for reproducing images in simulated natural color as in claim 1, in which the shapes of said clusters of elemental phosphor areas on said screen and said apertures in the color-selection electrode are substantially circular.

3. A cathode-ray tube for reproducing images in simulated natural color as in claim 1, in which said clusters of elemental phosphor areas on said screen, the individual elemental phosphor areas of said clusters, and the apertures in said color-selection electrode are of rectangular configuration.

4. A cathode-ray tube for reproducing images in simulated natural color as in claim 1, in which said clusters of elemental phosphor areas on said screen and the apertures in said color-selection electrode are of hexagonal configuration.

5. A cathode-ray tube for reproducing images in simulated natural color comprising: a mosaic image screen comprising a multitude of similar clusters of elemental phosphor areas, each cluster composed of one area of each of a plurality of phosphor exhibiting different color radiation in response to electron bombardment and collectively balanced to produce white light output in response to total-area excitation, each cluster spaced from each adjacent cluster by intermediate light absorbing areas of a width equal to at least one-third of the transverse dimension of the individual clusters; a color-selection electrode, in juxtaposition with said image screen, comprising a corresponding multitude of apertures each aligned with one of said clusters and each aperture being of corresponding shape and at least as large in size as the cluster with which it is aligned; means for projecting an electron beam through said apertured color-selection electrode onto said image screen; means for modulating the intensity of said electron beam; and means for varying the angle of incidence of said electron beam on said color-selection electrode to establish total-area excitation of said clusters for white light output and to establish controlled varying partial-area excitation of said clusters for different component colors of said reproduced image.

6. A cathode-ray tube for reproducing images in simulated natural color as in claim 5, in which said mosaic image screen is disposed on the inside surface of a transparent, clear glass face-plate of said cathode-ray tube.

7. A cathode-ray tube for reproducing images in simulated natural color comprising: a mosaic image screen comprising a multitude of similar clusters of elemental phosphor areas, each cluster composed of one area of each of a plurality of phosphor exhibiting different color radiation in response to electron bombardment and collectively balanced to produce white light output in response to total-area excitation and each cluster spaced from each adjacent cluster by an intermediate area adequate for the displacement of the deflected electron beam to establish a particular area of excitation for the pure color components in said cluster without overlapping phosphor areas of the adjacent clusters; a color-selection electrode, in juxtaposition with said image screen, comprising a corresponding multitude of apertures each aligned with one of said clusters and each aperture being of corresponding shape and at least as large in size as the cluster with which it is aligned; means for projecting an electron beam through said apertured color-selection electrode onto said image screen; means for modulating the intensity of said electron beam; and means for varying the angle of incidence of said electron beam on said color-selection electrode to establish total-area excitation of said clusters for white light output and to establish controlled varying partial-area excitation of said clusters for different component colors of said reproduced image.

8. A cathode-ray tube for reproducing images in simulated natural color comprising: a mosaic image screen comprising a multitude of similar clusters of elemental phosphor areas, each cluster composed of one area of each of a plurality of phosphor exhibiting different color radiation in response to electron bombardment and collectively balanced to produce white light output in response to total-area excitation and each cluster spaced from each adjacent cluster by a distance of at least one-third of its own characteristic transverse dimension; a color-selection electrode, in juxtaposition with said image screen, comprising a corresponding multitude of apertures each aligned with one of said clusters and each aperture being of corresponding shape and at least as large in size as the cluster with which it is aligned; means for projecting an electron beam through said apertured color-selection electrode onto said image screen; means for modulating the intensity of said electron beam; and means for varying the angle of incidence of said electron beam on said color-selection electrode to establish total-area excitation of said clusters for white light output and to establish controlled varying partial-area excitation of said clusters for different component colors of said reproduced image; the clusters of said elemental phosphor areas on the screen in registry with the apertures in said color-selection electrode being separated from each other by an intermediate area adequate for the displacement of the deflected electron beam components establishing a particular area of excitation for the pure color components in said cluster without overlapping phosphor areas of the adjacent clusters; portions of said intermediate space between adjacent clusters consectively receiving different sections of said electron beam as it is deflected between such different adjacent clusters to excite differently oriented individual phosphor areas thereof.

9. A cathode-ray tube for reproducing images in simulated natural color comprising: a mosaic image screen comprising a multitude of similar clusters of elemental phosphor areas, each cluster composed of one area of each of a plurality of phosphor exhibiting different color radiation in response to electron bombardment and collectively balanced to produce white light output in response to total-area excitation, and each cluster spaced from each adjacent cluster by a distance of at least one-third of its own characteristic transverse dimension; a color-selection electrode, in juxtaposition with said image screen, comprising a corresponding multitude of apertures each aligned with one of said clusters and each aperture being of corresponding shape and larger in size than the cluster with which it is aligned; means for maintaining said color-selection electrode and said mosaic image screen at substantially the same potential; means for projecting an electron beam through said apertured color-selection electrode onto said image screen; means for modulating the intensity of said electron beam; and means for varying the angle of incidence of said electron beam on said color-selection electrode to establish controlled varying partial-area excitation for different component colors of said reproduced image.

10. A cathode-ray tube for reproducing images in simulated natural color comprising: a mosaic image screen comprising a multitude of similar clusters of elemental phosphor areas, each cluster composed of one area of each of a plurality of phosphor exhibiting different color radiation in response to electron bombardment and collectively balanced to produce white light output in response to total-area excitation; each of said elemental phosphor areas having a conversion efficiency different than those of the other elemental phosphor areas in the same cluster, the sizes of the elemental phosphor areas in each cluster being an inverse function of their respective conversion efficiencies, and each cluster being spaced from each adjacent cluster by a distance of at least one-third of its own characteristic transverse dimension; a color-selection electrode, in juxtaposition with said image screen, comprising a corresponding multitude of apertures each aligned with one of said clusters and each aperture being of corresponding shape and at least as large in size as the cluster with which it is aligned; means for projecting an electron beam through said apertured color-selection electrode onto said image screen; means for modulating the intensity of said electron beam; and means for varying the angle of incidence of said electron beam on said color-selection electrode to establish total-area excitation of said clusters for white light output and to establish controlled varying partial-area excitation of said clusters for different component colors of said reproduced image.

11. A cathode-ray tube for reproducing images in comprising a multitude of similar clusters of elemental phosphor areas, each cluster composed of one area of each of a plurality of phosphor exhibiting different color radiation in response to electron bombardment and collectively balanced to produce white light output in response to total-area excitation, each of said elemental phosphor areas in each of said clusters being separated from each other, and each cluster spaced from each adjacent cluster by a distance of at least one-third of its own characteristic transverse dimension; a color-selection electrode, in juxtaposition with said image screen, comprising a corresponding multitude of aperatures each aligned with one of said clusters and each aperture being of corresponding shape and at least as large in size as the cluster with which it is aligned; means for projecting an electron beam through said aperture color-selection electrode onto said image screen; means for modulating the intensity of said electron beams; and means for varying the angle of incidence of said electron beam on said color-selection electrode to establish total-area excitation of said clusters for white light output and to establish controlled varying partial-area excitation of said clusters for different component colors of said reproduced image.

12. A cathode-ray tube for reproducing images in simulated natural color as in claim 11, in which the intermediate spaces between said elemental phosphor areas are occupied with a light absorbing material.

13. In combination: a mosaic image screen and a multi-apertured color-selection electrode for color cathode-ray tubes; said mosaic image screen comprising a multitude of similar clusters of elemental phosphor areas, each cluster composed of one area of each of a plurality of phosphor exhibiting different color radiation in response to electron bombardment and collectively balanced to produce white light output in response to total-area excitation, each cluster being spaced from each adjacent cluster by a distance of at least one-third of its own characteristics transverse dimension and the components of each cluster being spaced from one another, and said color-selection electrode disposed in juxtaposition with said image screen comprising a corresponding multitude of apertures each aligned with one of said clusters and each aperture being of corresponding shape and at least as large in size as the cluster with which it is aligned.

*14. A cathode-ray tube for reproducing images in simulated natural color comprising:*

*a mosaic image screen comprising a multitude of similar clusters of elemental phosphor areas, each cluster composed of one area of each of a plurality of phosphors exhibiting different color radiation in response to electron bombardment and producing white light output in response to concurrent excitation of said plurality of phosphors, and each cluster spaced from each adjacent cluster by a distance of at least one-third of its own characteristic transverse dimension;*

*a color selection electrode, in juxtaposition with said image screen, comprising a corresponding multitude of apertures each aligned with one of said clusters and each aperture being of a shape corresponding to that of the cluster with which it is aligned;*

*means for projecting an electron beam through said apertured color-selection electrode onto said image screen;*

*means for modulating the intensity of said electron beam;*

*and means for varying the angle of incidence of said electron beam on said color selection electrode to establish excitation of said clusters for white light output and to establish varying controlled partial-area excitation of said clusters for different component colors of said reproduced image.*

*15. A cathode-ray tube for reproducing images in simulated natural color as in claim 14, in which the shapes of said clusters of elemental phosphor areas on said screen and said apertures in the color-selection electrode are substantially circular.*

*16. A cathode-ray tube for reproducing images in simulated natural color as in claim 14, in which said clusters of elemental phosphor areas on said screen, the individual elemental phosphor areas of said clusters, and the apertures in said color-selection electrode are of rectangular configuration.*

*17. A cathode-ray tube for reproducing images in simulated natural color as in claim 14, in which said clusters of elemental phosphor areas on said screen and the apertures in said color-selection electrode are of hexagonal configuration.*

*18. A cathode-ray tube for reproducing images in simulated natural color comprising:*

*a mosaic image screen comprising a multitude of similar clusters of elemental phosphor areas, each cluster composed of one area of each of a plurality of phosphor exhibiting different color radiation in response to electron bombardment and balanced to produce white light output in response to concurrent excitation of said plurality of phosphors, and each cluster spaced from each adjacent cluster by a distance of at least one-third of its own characteristic transverse dimension;*

*a color selection electrode, in juxtaposition with said image screen, comprising a corresponding multitude of apertures each aligned with one of said clusters and each aperture being of a shape corresponding to that of the cluster with which it is aligned;*

*means for projecting an electron beam through said apertured color-selection electrode onto said image screen;*

*means for modulating the intensity of said electron beam;*

*means for varying the angle of incidence of said electron beam on said color selection electrode to establish said predetermined area excitation of said clusters for white light output and to establish different, controlled area excitation of said clusters for different component colors of said reproduced image;*

*the clusters of said elemental phosphor areas being separated from each other by an intermediate area adequate for the displacement of the deflected electron beam components establishing a particular area of excitation for the pure color components in said cluster without overlapping phosphor areas of the adjacent clusters, said adjacent clusters being so positioned that deflection of said electron beam to said pure color component area of said cluster is along a line perpendicular to a straight line joining the geometrical centers of said adjacent clusters;*

*portions of said intermediate space between adjacent clusters consecutively receiving different sections of said electron beam as it is deflected between such different adjacent clusters to excite differently oriented individual phosphor areas thereof.*

References Cited

The following references, cited by the Examiner, are of record in the patented file of this patent or the orginal patent.

UNITED STATES PATENTS

Re. 23,838 6/1954 Rajchman ---------- 313—86

JAMES W. LAWRENCE, *Primary Examiner.*

L. ZALMAN, V. LAFRANCHI, *Assistant Examiners.*